Dec. 26, 1922.

J. W. WORMAN.
DEMURRAGE CALCULATOR.
FILED JUNE 10, 1921.

1,440,326.

Patented Dec. 26, 1922.

1,440,326

UNITED STATES PATENT OFFICE.

JOHN WILLIAM WORMAN, OF MARSEILLES, ILLINOIS.

DEMURRAGE CALCULATOR.

Application filed June 10, 1921. Serial No. 476,585.

*To all whom it may concern:*

Be it known that I, JOHN W. WORMAN, a citizen of the United States, residing at Marseilles, in the county of La Salle and State of Illinois, have invented a new and useful Demurrage Calculator, of which the following is a specification.

This invention has reference to demurrage calculators, and its object is to provide a device with tables so arranged that both straight demurrage and average-agreement demurrage may be indicated quickly and accurately.

In accordance with the invention, there is provided a holder of elongated form with a passage lengthwise therethrough for accommodating a slide, and the device is furnished with an elongated slot of less width than the passage, with the slide approximating double the width of the slot, so that one-half only of the slide, and one face only of the slide is visible through the slot at any one time. Moreover, the slide is reversible, and contains two tables on each face, with the reading of the tables reversed so as to always hold the same relation to certain other tables or indicia on what may be termed the front face of the holder.

The invention will be best understood from a consideration of the following detailed description taken in connection with the accompanying drawing, forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:

Fig. 1 is a plan view of the calculator.

Fig. 2 is a plan view of one face of the slide employed in the calculator.

Fig. 3 is a plan view of the reverse face of the slide.

Fig. 4 is a cross section of the calculator shown in Fig. 1.

Referring to the drawings, there is shown a holder 1, which may be in the form of an elongated block of rectangular cross section, as indicated in Figs. 1 and 2, and provided with a longitudinal groove 2 in one face and the grooved face of the block is provided with a cover member 3, forming a receptacle and guide for a slide 4, which latter has channels 5 in its opposite faces to receive sheets 6 of paper or other suitable material, upon which imprints may be placed.

Wherever imprints are provided, provision may be made for protecting the imprints from being soiled and to permit washing of the surfaces to cleanse them. This may be accomplished by coating the printed surfaces with some such material as transparent celluloid or some suitable varnish.

The holder 1 on its outer surface is covered with a sheet 7 of paper or some other suitable material and traversing the cover member 3 is an elongated slot 8 which may be of a length to stop short of the ends of the body member, as shown at 9. The slot 8 is of a width approximately half that of the slide 4 without including edge ribs 10 which together are thicker than the thickness of the slide 4 and which travel in the channels 5 beyond the sides of the slot 8 so as not to be visible through said slots.

Produced on each face of the slide 4 are longitudinal rows of figures 11 and at the ends of the slide are indicia 12 representing the names of the calendar months. The figures 11 extend from one end of the slide to the other, except where the indicia 12 occur and on each face of the slide the month indicating indicia and the numerals 11 are arranged in six rows with the month indicating indicia and the figures reading oppositely for three of the rows to what is shown in the other three rows on the same face, and the same thing occurs on the opposite face of the slide.

The rows of figures on the slide are grouped to indicate weeks with the Sundays omitted so far as figures are concerned and only indicated by lines 13, which may be red lines, although any other indicating means for the purpose may be employed. Holidays are indicated by figures 14 on the slide 4 and these holiday designations will also be conveniently shown as red figures, although it will be understood that both the Sunday and the holiday designations may be otherwise indicated than by red marks or figures.

The cover sheet 7 has numerous imprints thereon, indicating certain information particularly adapted for the purposes of the invention.

Near one end of the sheet 7 and extending across the visible face of the holder is a legend "Arrival in town—notification" which legend appears on both sides of the slot 8. On the right hand side of the slot 8 below the legend "Notification—arrival in town" are two spaces each having the legend "Free day". Immediately adjacent to the slot 8 at the right hand side thereof and extending lengthwise of the holder 1 is a series of consecutive numbers 15 beginning at 1 and continuing in higher order to the bottom of the column and in the particular showing of the drawings reaching to the number 34. It is to be understood however, that the extent of the series of numbers 15 will depend upon the size of the instrument.

On the same side of the slot 8 as the column of numbers 15 and similarly spaced lengthwise of the holder, are value designations representing sums of money and in the particular showing of the drawing these values rise in two dollar steps for four spaces so that these value numbers read $2, $4, $6 and $8. Beyond the latter value number there are a continuation of the value numbers opposite the numbers 15 but increasing by $5 steps so that opposite the number 34 the value number reaches $158, but it is to be understood that these value numbers like the numbers 15 may reach higher values in accordance with the size of the instrument. On the opposite or left hand side of the visible face of the holder and below the designation "Arrival in town —notification" and printed in spaces provided for the purpose, is the legend "Credit day" and below it "Free day" and still further below occurs the legends "First debit day" up to "Fourth debit day", with these debit day legends flanked on the side towards the slot 8 by the numbers 1, 2, 3 and 4.

On the left hand side of the holder 1, below the legend "Fourth debit day" are progressively increasing value expressions, beginning with "$5.00 day" and increasing up to "$150 day", and between each one of the value legends and the slot 8 is a column of numbers 16 ranging from 1 to 30 progressively.

Between the column of numbers 16 and the corresponding edge of the slot 8 is a column 17 of numbers arranged in groups of six with each number in the group alike and the group numbers being consecutive.

In calculating and charging demurrage, there are two kinds to be taken into consideration; one kind is termed "Straight demurrage" and the other kind is termed "Average-agreement demurrage".

On "Straight demurrage" there are two days, or forty-eight hours, of free time after which there is a charge of $2 per day for the next four days, and following this there is a charge of $5 per day until the car or other container is unloaded. On straight demurrage, Sundays and holidays are not figured.

As an example, of the operation of the demurrage calculator of the invention, let it be assumed that a car arrives on April 4, 1921 and is not unloaded until April 23rd, and this may be further assumed to be indicated in Fig. 1. April 4, therefore, becomes the notification day, which of course is not charged. Following this, there are two free days in succession, indicated in Fig. 1 by the numbers 5 and 6, in the column of numbers on the slide 4 belonging to the designation "April". Up to April 6th, therefore, no demurrage has accrued. Beginning with April 7th, which in the setting of Fig. 1 is opposite the first demurrage day, indicated by the number 1 in the column 15, a demurrage of $2 is shown and this continues through the next four days until the demurrage has risen to $8, for the first four demurrage days are charged at $2 each and the accrued demurrage reaches $8. In straight demurrage Sundays and holidays are not figured.

Let it be assumed that the car which arrives on April 4 is not unloaded until April 23. Now by consulting the demurrage calculator and without any mental calculation but only ascertaining the demurrage shown, opposite April 23, it is found that such demurrage amounts to $63 which is the correct amount without the possibility of error which might occur if the calculator were not used. For ascertaining the straight demurrage, the right hand side only of the calculator is consulted.

The average-agreement demurrage for corporations is a special adjustment of demurrage charges. Suppose again that a car arrives at its designation on April 4. The agent notifies the corporation of the arrival. If the car be unloaded the next day, that day is a credit day for that car and this will offset a debit on any other car for the corporation. The second day is a free day, that is, no charge is made. The third day is the first debit day and the following three days are the second, third and fourth debit days. The charge for the debit days is $2 per debit with the credit days offsetting the debit days so far as they may and then after the fourth debit day begins the first $5 per day demurrage charge, which continues at the $5 rate until the car is unloaded, which may be assumed, as before, as occurring on April 23rd.

To use a calculator for this purpose the date, April 4 on the slide, is placed opposite the legend "Arrival in town" whereupon the date April 23rd on the slide is consulted. Opposite April 23rd on the left-hand side of the calculator is found the value number $55. However, the value column includes one Sunday as shown by the column 17 of figures which is added to the eleven demurrage days shown in the column 16 making the demurrage for twelve days $60. To this is added three debit days at $2 each, making a total of $6 so that the grand total of demurrage amounts to $66. In this manner both classes of demurrage are calculated by the calculator with a minimum of effort on the part of the operator.

The calculator permits direct readings in place of complicated countings on the calendar and uncertain selections of demurrage days. The demurrage calculator is intended for and is of particular use and need in freight offices, demurrage bureaus and in private business.

What is claimed is:—

1. A calculator for figuring demurrage, comprising a body member, a slide movable therethrough and provided with a column of figures indicating the days of the months, a fixed column of consecutive figures on the body cooperating with the movable column of figures on the slide to determine the number of demurrage days between certain calendar days of the months and indicia adapted to be so arranged relative to the movable column of figures for indicating holidays whereby certain holidays may be eliminated when determining the number of demurrage days.

2. A calculator for figuring either straight demurrage or average agreement demurrage, comprising a body member provided with a longitudinal passage having a sight slot, a slide movable in the passage and exposed at the slot, said slide being of greater width than the slot so as to expose but one-half of the slide through the slot, and said slide having both faces with longitudinally arranged columns of figures representing the days of the months, with a three months period readable in one direction lengthwise of the slide and another three months period readable in the reverse direction on the same face of the slide, both faces of the slide being alike in this respect, whereby the slide may be turned over to expose either face and turned end for end to display either group of three months on the same face of the slide, said sight slot being flanked on both sides with columns of fixed figures on the body member consecutively arranged and adapted to be brought in alinement with the figures on the slide to determine the number of demurrage days, and two columns of value-indicating figures, one column on each side of the body member, and arranged in transverse alinement with the said columns of fixed figures, said value indicating figures increasing in value by definite amounts and expressing the demurrage charges for the number of days indicated, one column of value-indicating figures representing different amounts from the other column.

3. A calculator for figuring demurrage, comprising a body member, a slide movable therethrough and provided with a column of figures indicating the days of the months, a fixed column of consecutive figures on the body cooperating with the movable column of figures on the slide to indicate the number of demurrage days between certain dates, and indicia on the body member defining free days or credit days and located in such a position in advance of the fixed column of figures whereby when the slide is positioned relative to the fixed column of consecutive figures certain days of demurrage intended as days of grace may be eliminated in the count by said consecutive figures.

4. A calculator for figuring demurrage, comprising a body member with a longitudinal passage therethrough having a narrow sight slot, a slide movable in the slot and provided with a column of figures indicating the days of the months with the figures indicating the Sundays eliminated from said column, indicia disposed between certain figures on the slide to indicate Sundays, a fixed column of consecutive figures on the body cooperating with the movable column of figures on the slide to determine the number of demurrage days between certain dates with the Sundays eliminated.

5. A calculator for figuring demurrage, comprising a body member with a longitudinal passage therethrough having a narrow sight slot, a slide movable in the slot and provided with a column of figures indicating the days of the months with the Sundays indicated by indicia, a fixed column of consecutive figures on the body cooperating with the movable column of figures on the slide to determine the number of demurrage days between certain dates with the Sundays eliminated, and a column of numbers on the body arranged in groups with the numbers of each group alike, and the group of six numbers being consecutively increased, said column of numbers cooperating with the figures on the slide whereby the number of Sundays between certain dates may be separatively determined.

6. A calculator for figuring demurrage, comprising a body member with a longitudinal passage therethrough having a sight slot, a slide movable through the longitudinal passage in the body member and visible through the sight slot therein, said slide having longitudinal columns of figures representing monthly calendar days imprinted on opposite faces, said sight slot being flanked on both sides with columns of figures consecutively arranged at a distance from the sight slot and cooperating with the columns of figures on the slide to determine the number of demurrage days between certain calendar days of the months, said body member also being provided with other columns of value-indicating figures increasing in value by definite amounts and expressing the demurrage charge for the number of days indicated, the slide having the longitudinal columns of monthly calendar days on each face of the slide representing six months in order and with the display on each face representing two groups in reverse order, with one group of three months only visible at a time through the sight slot.

7. A calculator for figuring demurrage, comprising a body with a longitudinal passage therethrough having a narrow sight slot flanked on one side with special legends reading "Notification", "Free day", each in a separate space, and "Debit day" in four spaces, also with a longitudinal column of spaced consecutive figures near the marginal edge of the sight slot beginning with the numeral "1", and with value-indicating figures in spaces adjacent the first-mentioned figure defining the demurrage charge for the debit days and for all following days, a slide movable through the longitudinal passage in the body member and visible through the sight slot therein and provided with figures indicating the calendar days of the month which are spaced to correspond to the spacing of the first-mentioned column of the consecutive figures, whereby the separate figures on the slide may be horizontally alined with any of the figures of the first-mentioned column and to cooperate with said figures to determine the number of demurrage days, with the corresponding adjacent value-indicating figures giving the demurrage charge, the special legend "Notification" providing an index for positioning the movable slide whereby certain days of grace may be eliminated from the count.

8. A calculator for figuring demurrage, comprising a body with a longitudinal passage therethrough, having a narrow sight slot flanked on one side with special legends reading "Holiday," "Notification," "Credit day," and "Free day," each in a separate space, and "Debit day" in four spaces, also with a longitudinal column of spaced consecutive figures near the marginal edge of the sight slot beginning with the numeral "1" in the space below the fourth debit day, value-indicating figures in spaces adjacent the first-mentioned figures defining the demurrage charges, a slide movable through the passage in the body member and visible through the sight slot therein and provided with figures indicating the calendar days of the month, said figures being spaced to correspond to the spacing of the first-mentioned column of figures, and adapted to be positioned with respect to said figures whereby the demurrage days are indicated by the first-mentioned column of figures and the demurrage charge by the adjacent value-indicating figures, and another column of figures at one side of the slot arranged in groups of six, with the numbers in each group alike, and the group numbers being consecutively increased; said figures cooperating with the figures on the slide for determining the number of Sundays to be added to the demurrage days, the special legend "Notification" providing an index for positioning the slide relative to the first-mentioned column of figures.

In testimony, that I claim the foregoing as my own, I have hereto affixed my signature.

JOHN WILLIAM WORMAN.